United States Patent [19]

Johnston

[11] Patent Number: 4,986,200

[45] Date of Patent: Jan. 22, 1991

[54] DEPTH GAUGE WHEEL

[75] Inventor: Mark Johnston, Macomb, Ill.

[73] Assignee: Yetter Manufacturing Company, Colchester, Ill.

[21] Appl. No.: 377,242

[22] Filed: Jul. 7, 1989

[51] Int. Cl.⁵ ............................................. A01C 23/02
[52] U.S. Cl. ..................................... 111/135; 111/121; 111/167
[58] Field of Search ......................... 111/121, 135–137, 111/163–169, 194–196; 301/37 S, 108 S, 37 P; 172/536

[56] References Cited

U.S. PATENT DOCUMENTS

| | | | |
|---|---|---|---|
| 336,475 | 2/1886 | Crossley | 172/536 |
| 629,138 | 7/1899 | Spalding et al. | 172/536 |
| 1,234,372 | 7/1917 | Miller | 111/135 X |
| 2,330,308 | 9/1943 | Orendorff | 111/194 X |
| 2,525,545 | 10/1950 | Hanson | 172/536 |
| 3,005,426 | 10/1961 | Sorensen et al. | 111/135 X |
| 3,664,434 | 5/1972 | Connor et al. | 111/135 X |
| 4,511,183 | 4/1985 | Spiegel et al. | 301/375 |
| 4,596,200 | 6/1986 | Gafford et al. | 111/136 X |
| 4,729,604 | 3/1988 | Dietz | 301/37 P X |
| 4,733,730 | 3/1988 | Murray | 111/135 X |
| 4,796,550 | 1/1989 | Van Matta et al. | 172/536 X |

FOREIGN PATENT DOCUMENTS 480857 2/1952 Canada ................................ 172/536

*Primary Examiner*—Danton D. DeMille
*Attorney, Agent, or Firm*—Lee, Mann, Smith, McWilliams & Sweeney

[57] ABSTRACT

A depth gauge wheel removably secureable to a coulter disc to control the cutting depth of the disc, the wheel formed of a high density plastic to which soil and other debris will not adhere.

6 Claims, 2 Drawing Sheets

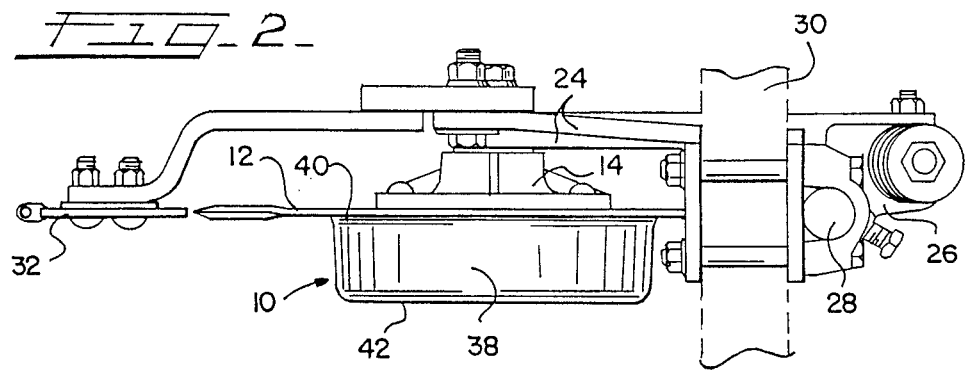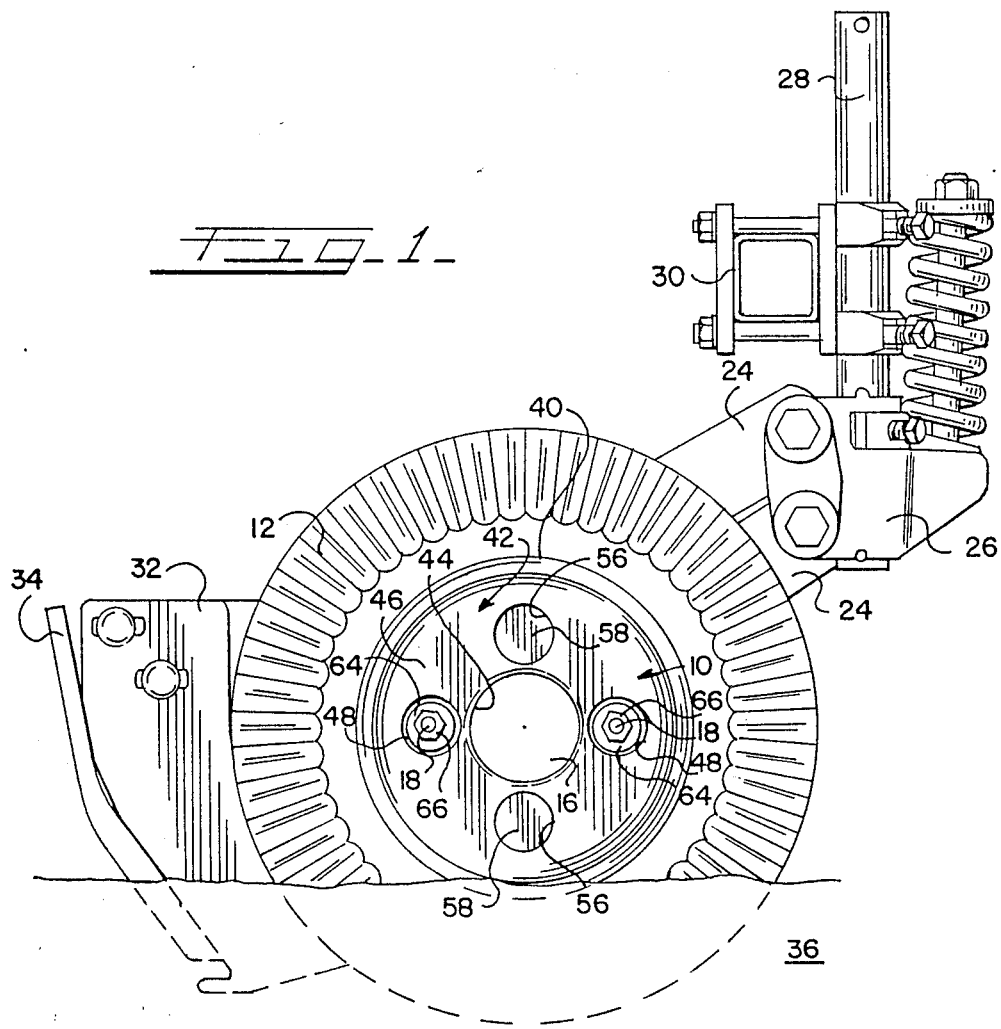

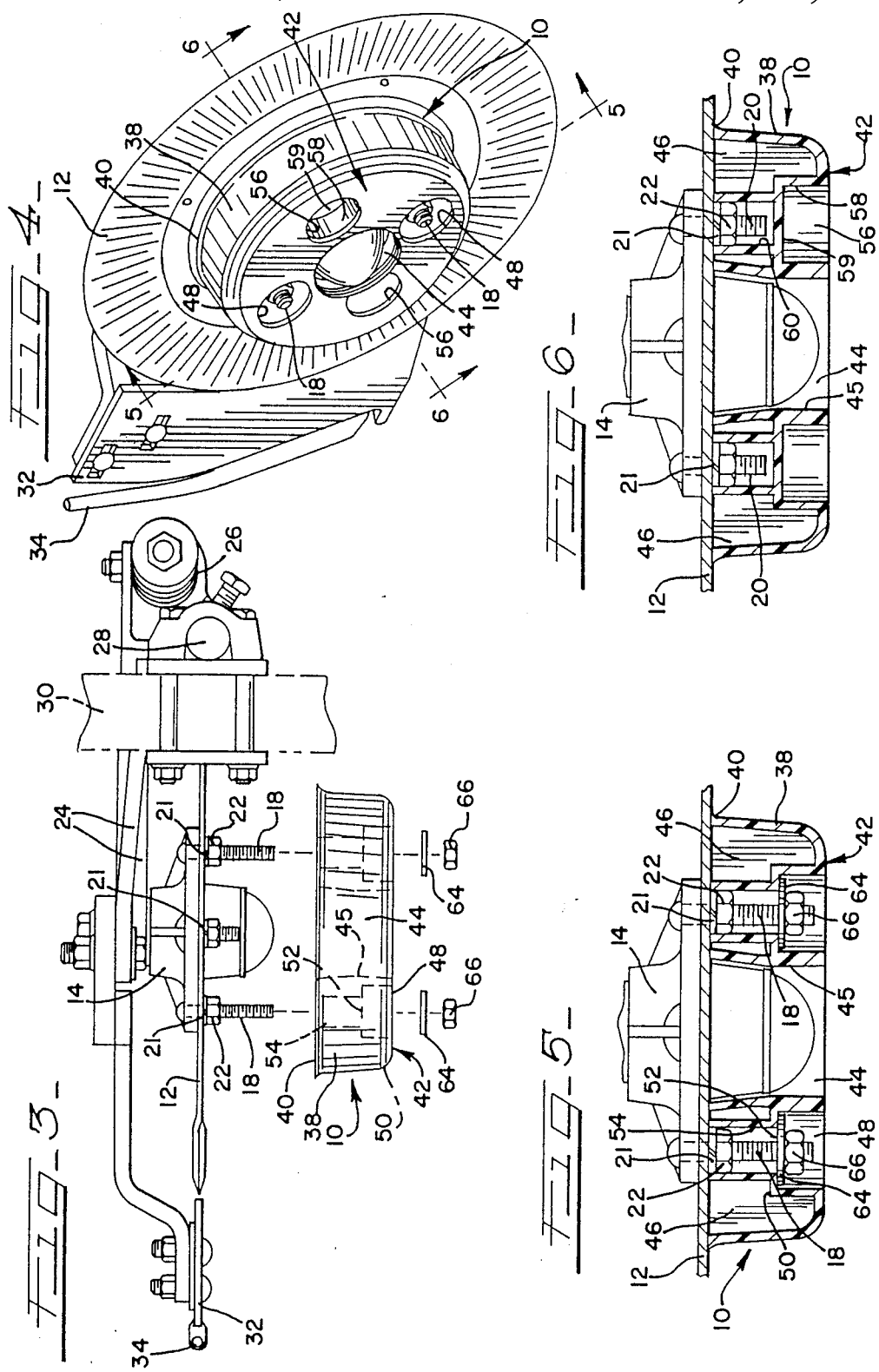

DEPTH GAUGE WHEEL

BACKGROUND OF THE INVENTION

The present invention is directed to a depth gauge wheel which is removably securable to a coulter disc. Numerous arrangements of this general type are disclosed in the prior art U.S. Pat. Nos. 182,829, 3,047,077, 3,664,434, 4,408,551 and 4,786,113. None of these patents discloses the features of the present invention.

SUMMARY OF THE INVENTION

The present invention is directed to a depth gauge wheel adapted to be removably secured to a coulter disc which is mounted on a hub, bearing and axle assembly. The depth gauge wheel functions to limit the depth to which the disc can penetrate the ground. The wheel includes an upstanding, concentric rim member which extends outwardly from the disc and an integral cover plate provided with a central aperture therethrough. A plurality of support walls extend radially from the aperture to the rim member. The central aperture encircles the hub upon which the coulter disc is mounted. The plate is provided with a plurality of sockets each of which includes a recessed bottom wall surface disposed between the cover plate and the coulter disc. Some sockets include an opening through the bottom wall surface to allow a fastener lug to be inserted therethrough. A complementary nut is secured over the lug bearing against the bottom wall thereby securing the gauge wheel to the coulter disc. Some sockets have an imperforate bottom wall.

BRIEF DESCRIPTION OF THE DRAWINGS

FIG. 1 shows a side elevational view of the depth gauge wheel of the present invention secured to a coulter disc and knife arrangement.

FIG. 2 shows a top view of the arrangement shown in FIG. 1.

FIG. 3 shows a top view of the arrangement with the depth gauge wheel positioned away from the coulter disc.

FIG. 4 shows a perspective view of the depth gauge wheel of the present invention secured to a coulter disc and knife arrangement.

FIG. 5 shows a cross-sectional view of the depth gauge wheel shown in FIG. 4 taken along lines 5—5.

FIG. 6 shows a cross-sectional view of the depth gauge wheel shown in FIG. 4 taken along lines 6—6.

DETAILED DESCRIPTION OF THE INVENTION

The drawings illustrate a depth gauge wheel 10 which is removeably securable to a coulter disc 12. The coulter disc 12 is mounted about a hub 14 which is rotatably supported on an axle (not shown) by a bearing. The disc 12 is secured on the hub 14 by means of two long lug bolts 18, two short lug bolts 20, four lock washers 21 and four hex nuts 22. The axle is supported at the ends of a pair of support arms 24. The opposite ends of the support arms 24 are attached to a mounting block 26 which is supported at the lower end of a shank 28 which is in turn clamped to an agricultural tool bar 30. The tool bar 30 is adapted to be pulled by a tractor or other motive means. A knife 32 with a liquid fertilizer application conduit 34 attached thereto is positioned rearwardly of the coulter disc 12.

The depth gauge wheel 10 is operative to limit the depth to which the disc 12 and knife 32 are permitted to penetrate the ground 36. Various operating depths may be attained by the use of different diameter gauge wheels which can easily and quickly be changed due to the features of the present invention. The wheel 10 includes an upstanding, concentric rim member 38 which, when attached adjacent to the coulter disc 12, extends outwardly therefrom. About the inner edge of the rim member 38 is formed a slightly outwardly curved lip 40, best shown in FIG. 3, which is disposed adjacent to and in contact with the disc 12. The curved lip 40 provides a smooth transition of flow of dirt from the disc 12 to the wheel 10 and eliminates a corner between the wheel 10 and disc 12 which initiates the build-up of dirt around the circumference of the wheel 10. The outer edge of the rim member 38 includes an integral circular cover plate 42 having a centrally-located aperture 44 therethrough. The aperture 44 is sized to receive the hub 14 and defines an inwardly extending cylindrical wall 45. The clearance between the wall 45 and hub 14 is sized so as to provide a snug fit since the wall 45 bears the load of the wheel 10. As seen in FIGS. 5 and 6, a plurality of radially extending support walls 46 extend between the wall 45 and the rim member 38 and transmit the load on the rim 38 to the hub 14. These support walls 46 add rigidity and strength to the gauge wheel 10 which is necessary to prevent damage thereto when, for example, the wheel 10 strikes a rock.

Two pairs of recessed sockets are shown formed in the cover plate 42 at equidistances from each other. The first pair of sockets 48, best shown in FIG. 5, are disposed 180° from one another and each includes a recessed bottom wall surface 50. An aperture 52 is centrally provided through each bottom wall surface 50. A cylindrical sleeve 54 extends from the bottom wall surface 50 toward the disc 12. The opening 52 and sleeve 54 are sized to receive lug bolt 18. The second pair of sockets 56, best shown in FIG. 6, are disposed 180° from one another and are positioned intermediate sockets 48. Each socket 56 defines a recess having a side wall 58 and a bottom wall 59, however, no aperture is centrally provided through the bottom wall 59, which is imperforate. An integral cylindrical sleeve 60 extends inwardly from each bottom wall 59 and is adapted to receive a lug bolt 20.

The wheel 10 is assembled to the disc 12 as follows. The sleeves 60 are aligned with the short bolts 20 and the sleeves 54 are aligned with the long bolts 18. The rim lip 40 is placed adjacent to and in contact with the surface of the disc 12 so that the bolts 18 extend through the openings 52 in the bottom wall surfaces 50. Washers 64 are then disposed about the bolts 18 so that they lie adjacent the bottom wall surfaces 50 and hex nuts 66, preferably lock nuts, are threaded on the bolts 18 to secure the wheel 10 to the disc 12. The washers 64 prevent debris from getting into the recesses 54 and distribute the clamping force on each bottom wall surface 50. The imperforate bottom walls 59 cover and protect the lugs 20 and associated nuts from contamination by dirt and rust. The wheel 10 is quickly and easily mounted directly to the disc 12 using the same bolts 18 which were used to mount the disc 12 by simply affixing an extra set of nuts 66 and washers 64 over the bolts 18 within sockets 48. All mounting lugs and associated fasteners are recessed inside of the plane of the cover plate 42 so that nothing extends beyond this plane to injure or snag.

As illustrated in FIG. 1, once attached to the disc 12, the wheel 10 acts to limit the depth to which the disc 12 and knife 32 can penetrate the ground 36, and consequently the depth at which the fertilizer is placed therein. The depth can be varied by using gauge wheels of differing diameters, for example, a gauge wheel having a smaller diameter would permit deeper placement. The unique construction of the depth gauge wheel of the present invention allows rapid interchange of different size wheels.

The gauge wheel 10 is constructed of a high density plastic with a high degree of lubricity. A resin which has been found suitable for this application is a Type 6 Nylon sold by Allied Engineering Plastics under the designation Capron 8202. The high degree of lubricity prevents soil and other debris from adhering to and building up on the wheel 10. When debris builds up on the wheel 10 the diameter is effectively increased thereby decreasing the depth that the disc 12 penetrates the ground 36 and interfering with the accurate placement of the fertilizer since it is desirable that the application depth remain constant. The gauge wheel of the present invention may be used regardless of the condition of the soil, whether muddy or damp, whereas conventional gauge wheels can only be used under near perfect, dry conditions.

Thus it has been shown that the present invention provides a gauge wheel for limiting the depth to which a coulter disc can penetrate the ground which is quickly and easily mounted directly to a coulter disc.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A depth gauge wheel adapted to be positioned adjacent a coulter disc and adapted to be mounted on a rotatable hub to limit the depth to which the coulter disc can penetrate the ground during operation, said depth gauge wheel including an upstanding concentric rim member having an inner edge surface and an outer edge surface, said rim member extending outwardly from the coulter disc when positioned adjacent thereto; a circular cover plate integrally formed with said rim member at said outer edge surface thereof; a first aperture defined through said depth gauge wheel centrally thereof to provide access to and to receive therein the hub for mounting of said depth gauge wheel on the hub; a plurality of sockets defined in said cover plate positioned radially outwardly of said first aperture, each of said sockets including a bottom wall positioned between said inner and outer edge surfaces of said rim member and at least one second aperture passing through said bottom wall of one of said sockets, a sleeve extending between said bottom wall of at least one of said sockets and said inner edge surface of said rim member, whereby said first aperture provides a recess for insertion of the hub and said second aperture provides a passage through which lugs extending from the hub may pass and each said sleeve is positioned to receive a lug extending from the hub and said bottom wall of said sockets provide a bearing surface for securement of fasteners over the lugs to thereby secure said depth gauge wheel adjacent the coulter disc.

2. A depth gauge wheel as in claim 1 in which said bottom wall of some of said sockets is imperforate to cover and protect the lugs extending from the hub from contamination.

3. A depth gauge wheel as in claim 1 including an outwardly curved lip formed at said inner edge surface of said rim member positionable adjacent to and in contact with the coulter disc.

4. A depth gauge wheel as in claim 1 including a cylindrical wall extending inwardly from said cover plate toward the coulter disc, said cylindrical wall providing a mounting surface for supporting said depth gauge wheel on the hub.

5. A depth gauge wheel as in claim 4 including a plurality of radially extending support walls extending between said cylindrical wall and said rim member to provide support and rigidity for said depth gauge wheel.

6. A depth gauge wheel as in claim 1 in which said rim member and said cover plate are integrally formed from a high density plastic with a high degree of lubricity to prevent adherence of dirt to its outer periphery.

* * * * *